3,356,762
VULCANIZABLE ETHYLENE COPOLYMER
RUBBERS
Earl D. Holly, deceased, late of Midland, Mich., by Chemical Bank and Trust Co., administrator, Midland, Mich., assignor to The Dow Chemical Company, Midland, Mich., a corporation of Delaware
No Drawing. Filed Nov. 15, 1965, Ser. No. 507,960
9 Claims. (Cl. 260—878)

This application is a continuation-in-part of application, Ser. No. 207,771, filed July 5, 1962, now abandoned.

This invention relates to a process for rendering ethylene copolymer rubbers curable by sulfur and by sulfur-containing vulcanizing agents and also relates to the products obtained by such a process.

Recent advances in the art of polymerization have made available rubbery copolymers of ethylene and alpha-olefins. Such copolymers are useful because of their combination of resistance to aging and to oxidation and because of their excellent elastic properties. These copolymers have a greater range of usefulness, such as in tires, tubes and molded goods, when they are cured, vulcanized, or cross-linked in order to reduce the thermoplasticity and increase tensile strength. It is already known that these copolymers may be vulcanized by heating them with peroxides, perhaps in the presence of sulfur or of a quinone oxime or of a vinyl aromatic hydrocarbon or of an unsaturated acid and a metal oxide. Such free radical vulvanization recipes differ in kind from the sulfur plus accelerator recipes normally used for vulcanization of conventional unsaturated rubbers. It is also known to make elythlene-propylene copolymers sulfur-curable by first chlorinating the polymer, sometimes followed by a separate dehydrochlorinating step. In either case cross-linking is preceded by formation of carbon-to-carbon double bonds along the main chain of the polymer molecule. It is, however, necessary to introduce such a high level of chlorine content initially in order to get sulfur curability that the resilience is reduced and brittle point raised. When the polymer is pre-dehydrohalogenated, it loses the outstanding resistance of ethylene-propylene copolymer rubbers to attack by oxygen and ozone. Further, it is known to copolymerize ethylene and alpha-olefins with monomers containing multiple double bonds to give a product which has residual ethyenic double bonds. These double bonds, however, may appear in the copolymer product as part of the main chain which also results in the loss of some of the excellent resistance to oxygen and ozone possessed by the ethylene-propylene rubbers.

It is an object of this invention, therefore, to provide a process whereby ethylene copolymer rubbers are made curable by sulfur and sulfur-containing vulcanizing agents together with appropriate accelerators and to provide by such a process, products which have the combined advantages of (1) resistance to aging and to oxidation, (2) excellent elastic properties such as high resilience and low brittle point, (3) compatibility of cure with natural, styrene-butadiene, butyl, or diene rubbers, (4) and tolerance for acid clays and antioxidants.

It has now been found, and this discovery is the subject of the present invention, that when ethylene copolymer rubbers are intimately mixed with certain chlorine-containing compounds, hereinafter defined, in the presence of means by which reactive free radicals are produced as hereinafter described at a temperature from about 120° C. to about 250° C. under conditions selected such that substantial cross-linking does not occur, a reaction occurs between the said chlorine-containing compound and the said copolymer rubber to produce a modified copolymer rubber which is curable by sulfur and by sulfur-containing vulcanizing agents using vulcanizing procedures which are conventional for unsaturated rubbers, natural or snythetic; and such modified ethylene copolymer rubbers have the combined advantages: (1) resistance to aging and to oxidation, (2) excellent elastic properties such as high resilience and low brittle point, (3) compatibility of cure with natural rubbers and with synthetic rubbers such as styrene-butadiene, butyl and diene rubbers, and (4) tolerance for acid clays, antioxidants and other compounding ingredients.

The practice of this invention is especially advantageous with ethylene-copolymers of low crystallinity, i.e. less than about 10 percent as measured by X-ray diffraction and more especially such copolymers as are characterized by high resilience, low modulus, high elongation and high reversible elastic response. Such copolymers may be prepared as taught in Italian Patent No. 554,803. These high molecular weight copolymers of ethylene and other non-aromatic, terminally-unsaturated mono-olefins of from 3 to 6 carbon atoms, substantially free of homo-polymers of the constituent olefins and having elastomeric properties, may be obtained by interpolymerization of a mixture of ethylene and said mono-olefins with certain catalysts as described in the cited Italian patent or with catalyst combinations disclosed more recently but which are known to the art to produce, by well known procedures and conditions, copolymers which are largely amorphous and which are elastomeric. To prepare a product for use in this invention, the important feature is not the particular catalyst system which is used nor the exact conditions employed in the polymerization, but rather that a copolymer (within the range of composition disclosed hereinafter) is provided which has less than about 10 percent crystallinity as determined by X-ray diffraction.

Advantageously, for such ethylene copolymer rubbers, the constituent olefins are used in sufficient quantities that the copolymer contains from about 20 to about 80 mole percent of units derived from ethylene and from about 80 to about 20 mole percent of units derived from the alpha-olefin, preferably an alpha-olefin of the type $$RCH=CH_2$$

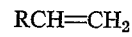

where R is a $C_1$ to $C_4$ alkyl radical. Such alpha-olefins are propylene, 1-butene, 1-pentene, 3-methyl-1-butene, 1-hexene, 3-methyl-1-pentene, 4-methyl-1-pentene and 3,3-dimethyl-1-butene.

In addition to such ethylene copolymer rubbers as have been described, there are used, in the practice of this invention, other copolymer rubbers containing units of ethylene and other α-olefins in about the aforementioned ratio but having up to about 10 mole percent, based on the total molar composition, of units derived from mono-vinyl aromatic monomers such as styrene, vinyl toluene, and the like. Such copolymer rubbers are prepared in substantially the same manner as for the other ethylene copolymer rubbers.

Likewise, ethylene copolymers which contain small amounts of residual unsaturation in insufficient quantity to allow a desired amount of cure by use of conventional sulfur and sulfur containing vulcanizing agents are modified by the practice of this invention to provide additional sites at which such vulcanization can occur. Such modification is particularly advantageous when the concentration of carbon-carbon double bonds before modification ranges up to about 0.3 mole per liter of the copolymer rubber. Ethylene copolymers containing small amounts of ethylenic unsaturation may be obtained, for example, by copolymerization of ethylene with other alpha-olefins and dienes, either conjugated or non-conjugated, by the methods discussed in E. K. Gladding, B. S. Fisher and J. W. Collette, "A New Hydrocarbon Elastomer. Copolymerization of Olefins and Non-conjugated Dienes," Industrial and Egineering Chemistry, Product Research and Development, 1, No. 2, p. 65.

The chlorine-containing compounds which are used in the practice of this invention to modify ethylene copolymer rubbers are halohydrocarbons, wherein the halogen atoms have atomic numbers from 9 to 17, selected from the class consisting of carbon tetrachloride, hexachloroethane and halogen-substituted ethylenically unsaturated aliphatic hydrocarbons having at least one of two classes of chlorine substituents, Class A being a chlorine atom attached to an allylic carbon atom and Class B being at least two chlorine atoms attached to doubly bonded carbon atoms. Hence the halogen-substituted ethylenically unsaturated halohydrocarbons require a chlorine substituent on one specific carbon atom (Class A) or at least two chlorine atoms on certain other specific carbon atoms (Class B) but may have other chlorine substituents or fluorine substituents attached to the same or other carbon atoms in the molecule. In Class B, the two required chlorine atoms may be attached to the same carbon participating in a double bond or one chlorine atom may be attached to each of two carbon atoms participating in the same double bond, i.e., the ethylenic unsaturation. Halogen-substituted ethylenically unsaturated aliphatic hydrocarbons having chlorine substituents of both Class A and Class B in the same molecule also are operable in the practice of this invention.

Halogen-substituted ethylenically unsaturated aliphatic hydrocarbons having chlorine substituents of Class A are represented by allyl chloride; 1,3,4,4-tetrachloro-1,2,3,4-tetrafluorobutene-1; 3-chloro-3,3-difluoropropene and 1,4-dichlorobutene-2.

The operable halohydrocarbon compounds having chlorine substituents of Class B are represented by 1,2-dichloroethylene (cis-dichloroethylene, trans-dichloroethylene and mixtures thereof); vinylidene chloride; 1,2-dichloro-1,2-difluoroethylene; trichloroethylene; tetrachloroethylene; 1,1,2-trichloro-3,3,3-trifluoropropene and 1,2-dichlorohexafluorocyclopentene-1.

The operable halohydrocarbon compounds having chlorine substituents of both Class A and Class B are represented by hexachlorobutadiene, 1,2,3-trichloropropene, hexachloropropene and hexachlorocyclopentadiene.

The free radical producing means which are used to promote the reaction between the chlorine-containing compound and the ethylene copolymer rubber are those means which provide reactive free radicals. By "free radical producing means which provide reactive free radicals" is meant free radical producing means which, when applied to ethylene polymers, abstract hydrogen atoms from the polymer chains, forming radical sites on such chains and causing cross-linking. Suitable such reactive free radical producing means are illustrated in U.S. Letters Patent No. 2,628,214. In the presence of the specified chlorine-containing compounds in accordance with this invention, such reactive free radical producing means do not cause appreciable cross-linking of the ethylene copolymer rubber but are effective in causing modification of the copolymer rubber by the chlorine-containing compounds as described.

Such suitable means of producing reactive free radicals include the decomposition of certain classes of compounds which undergo homolytic cleavage to form radicals of the required reactivity as hereinbefore described; these classes of compounds include dialkyl peroxides, diacyl peroxides, peresters, N-chloro compounds, sulfonyl halides, and hydroperoxides. Representative operable compounds are di-t-butyl peroxide, dicumyl peroxide, lauroyl peroxide, caprylyl peroxide, acetyl peroxide, benzoyl peroxide, 2,4-dichlorobenzoyl peroxide, p-chlorobenzoyl peroxide, t-butyl peroxyisobutyrate, 2,5-di-t-butylperoxy-2,5-dimethylhexyne-3, t-butyl peracetate, t-butyl perbenzoate, di-t-butyl diperphthalate, N,2,6,-trichloroquinonimide, chlorazene, trichloromethane sulfonyl chloride, carbon tetrachloride, hexachloroethane, t-butyl hypochlorite, sulfuryl chloride, cumene hydroperoxide, t-butyl hydroperoxide, methyl ethyl ketone peroxide, p-menthane hydroperoxide, pinane hydroperoxide, and 2,5-dimethylhexane-2,5-dihydroperoxide. Preferably, the catalyst should be selected either to have an efficient rate of decomposition at the anticipated reaction temperature or it should be employed in such a manner that its efficient function is facilitated at such temperatures.

While operable, the hydroperoxides are not ordinarily selected as one of the preferred class because of their sensitivity, particularly in the presence of chlorine-containing materials, to transition metal catalyst residues in the polymer or to metallic ions, particularly iron, introduced into the ingredients from metal equipment used in the processing or manufacturing of the materials. Such impurities may lead to decomposition of the hydroperoxides by side reactions at the expense of the desired reaction.

The energy required to bring about the homolytic cleavage of the various compounds described supra to form suitable free radicals often is provided by thermal means. However, irradiation with ultraviolet light causes dissociation of these compounds into free radicals which undergo the same types of reaction as free radicals produced thermally. (See Cheves Walling, "Free Radicals in Solution," John Wiley & Sons, Inc., New York, 1957, p. 544.) Additional classes of compounds which may be photodissociated to form suitable radicals are ketones, esters, benzoins, chlorine, and various chlorine carriers such as N-chlorosuccinimide, antimony pentachloride and the like.

High energy radiation, i.e., alpha and beta particles and X- and gamma-radiation, also initiates free radical reactions. In the instant invention, however, it is more difficult to suppress undesirable cross-linking reactions while achieving sulfur vulcanizability when high energy radiation is used compared to initiation by the thermal dissociation of suitable compounds. Nevertheless, that high energy radiation may be used satisfactorily in the practice of this invention, if desired, is shown in the subsequent Example No. 19.

The improved products of this invention are obtained by intimately mixing the ethylene copolymer and the chlorine-containing compound and effecting reaction between them by means for producing reactive free radicals, all as previously defined. The chlorine-containing compound is used in a quantity which ranges from 0.035 part to 24 parts per part of the ethylene copolymer, where such proportions are calculated on a weight basis. When homolytically cleavable compounds such as diacyl peroxides, dialkyl peroxides, peresters, N-chloro compounds, organic sulfonyl chlorides and the like are selected for producing free radicals, they are used in quantities ranging from about 4 to about 40 millimoles per 100 grams of the ethylene copolymer rubber. The length of time and other conditions for the reaction of the mixture of the ethylene copolymer rubber, the specified chlorine-containing compound and such initiators are selected to provide preferably at least about 5 half-lives for the decomposition of the homolytically cleavable compound. Thus, preferable operating temperatures range from about 135° to about 200° C. but temperatures up to about 250° C. or temperatures as low as 120° C. or below may be used.

When temperatures below 120° C. are used in a modification reaction with the same materials, the product obtained does not possess to a sufficient degree the advantageous curability provided by the present invention. When temperatures greater than about 250° C. are used, undesirable decomposition or scission reactions often occur.

A product with better properties, as determined by the properties of the vulcanizate subsequently prepared therefrom, is obtained in the practice of this invention when operating during the modification reaction for a relatively short time and a correspondingly higher temperature, such as 190° C., rather than for a longer time at a lower temperature, such as 135° C. At a given temperature, a time corresponding to about 5 to 10 half-lives of the initiator being decomposed gives optimum results.

While not bound by a specific theory of operation it is believed that, in the practice of this invention, etheylenically unsaturated groups (which may be halo-substituted) are attached to the copolymer chain and that it is through such pendant unsaturated groups that sulfur vulcanizability is imparted to the rubber. The curability of the modified copolymer rubber obtained by reaction of the starting copolymer rubber with the specified halohydrocarbon is not directly related to the total chlorine content of the product. The chlorine which is incorporated into the product, i.e., the modified ethylene copolymer rubber, is introduced as a consequence of being a part of the molecule which is attached to the polymer chain during the reaction rather than because of a chlorination reaction. For example, in the reaction of tetrachloroethylene with the starting ethylene copolymer rubber, a hydrogen from the rubber and a chlorine from the tetrachloroethylene are split off to form HCl and the residue of the tetrachloroethylene molecule is attached to the polymer chain in a manner shown schematically as follows:

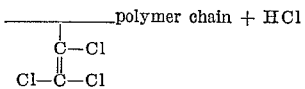

When the product is subsequently cured, the curing reaction occurs primarily as a consequence of the double bond rather than because of the chlorine atoms.

Similar reactions occur with the other operable ethylenically unsaturated halohydrocarbons. While different transition states are involved, it is believed that when hexachloroethane or carbon tetrachloride are the halohydrocarbons which are caused to react with the starting ethylene copolymer rubber, the modified rubber also contains pendant ethylenically unsaturated groups as a consequence of the modification reaction. In any event, with any of the operable halohydrocarbon components, the modification reaction is carried out to an extent such that less than about 4 percent by weight of chlorine is found in the modified ethylene copolymer rubber, the percentage being based on the total weight of the product.

In addition to use as members of the class of chlorine-containing compounds of this invention either carbon tetrachloride or hexachloroethane acts as an initiator. When either carbon tetrachloride or hexachloroethane with thermal activation is used, the temperature required is usually between about 190° and about 250° C. At such temperatures, either compound may be used both as initiator and reactant with the ethylene copolymer rubbers or it may serve as initiator for the reaction of another of the chlorine-containing compounds with the said ethylene copolymer rubber.

In carrying out the modification reactions which have been described, added solvents may be used, if desired. Suitable solvents are organic or halogenated organic solvents; for example, tetrachloroethylene, carbon tetrachloride, benzene or the halobenzene solvents such as chlorobenzene, o-dichlorobenzene, and the like.

The novel products of this invention comprise ethylene copolymers which have been modified by reaction with the specified chlorine-containing compounds so that such modified copolymers are vulcanizable by the various procedures and variations of sulfur curing which are familiar to those skilled in the processing of natural rubber and of synthetic rubbers such as styrenebutadiene rubber (SBR), and butyl rubber. Such procedures and variations of sulfur curing are described in various well-known standard publications such as Kirk and Othmer, Encyclopedia of Chemical Technology, Interscience Encyclopedia, Inc., New York, 1953, vol. 11, pp. 892–927; Davis and Blake, The Chemistry and Technology of Rubber, Reinhold Publishing Corp., New York, 1937, pp. 237–268; W. J. S. Naunton, The Applied Science of Rubber, Edward Arnold (Publishers) Ltd., London, 1961, pp. 992–1099.

In the subsequent examples the ethylene copolymer rubbers used for modification by the method of this invention are described by their reduced specific viscosity (RSV), percent crystallinity, and composition of the copolymer expressed as mole percent of the constituent monomers which are combined therein. Such characterizations were carried out as follows:

The "Reduced Specific Viscosity" (RSV) value of each copolymer rubber is the specific viscosity of a solution of 0.02 gram of the polymer in 100 milliliters of decahydronaphthalene at 135° C., divided by the concentration of the polymer solution, 0.02 gram per 100 milliliters. The dimensions of RSV are deciliters per gram.

The values of "Relative Crystallinity, X-ray" were calculated in the following way: An X-ray diffraction pattern for the polymer product was obtained in conventional manner using a diffractometer having Cu-K radiation and a Geiger counter detector to make a rectilinear record of intensity vs. the $2\theta$ angle. On the record, there was then drawn a "back-ground" line, a straight line between the intensity values at the $2\theta$ angles of 10° and 30°, respectively. When the polymer was totally amorphous, the record (when smoothed to eliminate small irregularities caused by instrument "noise" and imperfections) was a single rounded "hump." When crystallites were present in the polymer composition, the record showed significant peaks superimposed on the amorphous "hump," the area under the peaks (and above the amorphous "hump") being related to the amount of crystallites in the composition. On a record showing such crystallite peaks, a smoothed line was drawn through the unpeaked portion of the amorphous "hump," the bases of the crystallite peaks and the valleys between such peaks. The result was a difinition of an area (A) between the "back-ground" line and the amorphous "hump" line, and another area or areas (C), between the amorphous "hump" line and the superimposed crystallite peaks. The ratio of the total area of such peaks (C) to the whole area above the "back-ground" line $(A+C)$, times 100, is the "Relative Crystallinity," i.e., $$\frac{C}{C+A} \times 100 = \text{Percent Relative Crystallinity}$$

No corrections were applied to the record for instrument geometry or like factors in obtaining these results.

The composition of the copolymer product in terms of the constituent olefins polymerically combined therein was determined by infrared spectral analyses by comparison with standardized mixtures of polyethylene and polypropylene of similar configuration using principally the absorptions at 6.83 and 7.28 microns.

The chlorine-content of the vulcanizable ethylene copolymer rubbers, except as otherwise stated, was determined by decomposition of a small sample by sodium peroxide fusion in a Parr bomb (see Lemp and Broderson, Journal of the American Chemical Society 39, 2069, (1917)) followed by a volumetric determination by regular Volhard procedure. The results are shown in percent by weight.

For certain products, as specified, the chlorine content was determined by the neutron-activation method described by Anders and Beamer in Analytical Chemistry 33, 226 (1961).

The state of cure of vulcanized samples of the modified ethylene copolymer rubbers such as those described in the following examples was characterized by the weight swelling ratio, the gel content, the cross-link density and in some cases the tensil strength and ultimate elongation.

In determining the weight swelling ratio, the uncrosslinked fraction was removed from weighed, cured films of 10 mil thickness by extracting the films in benzene for 8 hours at 70° C. After the samples were allowed to stand for about 6 hours in benzene at 25° C., the swollen gel remaining from the films was removed from the benzene, the surface solvent removed by allowing the solvent to evaporate until the surface appeared dry and then immediately weighing such swollen gels. The gels were then dried in vacuo at 60° C. and the dried weight was obtained. After making appropriate adjustments for the fillers present, the percent of the rubber gelled and the weight swelling ratio were calculated. The weight swelling ratio is $$\frac{X-a}{Y-a}$$

and the percent gel is $$\frac{Y-a}{Z-a} \times 100$$

where $X$ is the weight of the swollen gel, $Y$ is the weight of the dried gel, $Z$ is the weight of the sample, and $a$ is the weight of the inerts (fillers).

The molar concentration of the cross-links in the gel was calculated according to the correlation of G. Crespi and M. Bruzzoni, Chim e Ind (Milan) 41, No. 8, 741–748 (1959). Crespi and Bruzzoni used the volume swelling ratio whereas in these calculations, the weight swelling ratio was used. However, the correction ordinarily required to convert from one to the other of these ratios involves the density of the solvent, benzene, and the density of the rubber. Since the density of benzene and the density of the particular rubbers tested in these experiments were very nearly the same, no correction was made. The cross-link concentration obtained by that correlation was multiplied by the percent gel in order to express the cross-link concentration in terms of the entire sample of rubber.

The tensil strength and elongation data were obtained from the average of the results from three ⅛-inch strips cut from another section of the same 10-mil film which was used for the weight swelling measurements previously described. Such strips were pulled in an Instron Electronic machine, Model TTB, with one-inch jaw separation, at a cross-head speed of 2 inches per minute, i.e., a stretching rate of about 200 percent of original length per minute. The tensil strength is expressed in pounds per square inch of unstretched cross-section and the ultimate elongation is shown as percent of original length, at break.

Experiments with various vulcanization systems with the modified ethylene copolymer rubbers of this invention have shown that attainment of gel fractions of over 70 and preferably greater than 85 percent as well as cross-link densities of from about 0.02 to about 0.3 and preferably from about 0.1 to 0.3 mole per liter of rubber are necessary to achieve the desired physical properties in the reinforced vulcanized rubber.

The modified ethylene copolymers of this invention may be compounded with reinforcing and extending fillers such as carbon black, clay, or silica, and with peptizers, softeners, stabilizers, antioxidants, processing aids and the like.

The products of this invention find usefulness in tires, inner tubes, footwear, coated fabrics, and many kinds of coated and molded articles. A combination of resistance to aging and to oxidation, excellent elastic properties, compatibility of cure with natural, GR–S or diene rubbers, and tolerance for a wide variety of compounding agents make these products especially advantageous for such uses.

The following examples are given to illustrate the preparation of the novel products of the present invention. The particular copolymer rubber compositions shown in the examples should not be construed as limiting the scope of the instant invention.

*Example 1.*—In 121 g. of AR benzene were dissolved 10 g. of an ethylene-propylene copolymer rubber, comprising about 47 mole percent of units derived from ethylene and about 53 mole percent of units derived from propylene, and having an RSV value of 4.3 and less than 1 percent crystallinity, then 0.4 g. of 2,5-di-t-butyl-peroxy-2,5-dimethylhexyne-3 and 0.02 mole of one of the chlorine-containing compounds as listed in items 1–7, Table I, were added to the solution. The resulting mixture was heated for 25 hours at 135° in glass bottles with agitation, then the modified rubber was recovered by precipitation with methanol and was subsequently dried at 60° C. in a vacuum oven. The chlorine content of the product was determined by the previously described method. The vulcanizability of the dried products was characterized by (1) milling on rolls in the following recipe:

|  | Grams |
|---|---|
| Modified copolymer rubber | 2 |
| HAF carbon black | 1 |
| Zinc oxide | 0.1 |
| Stearic acid | 0.04 |
| Sulfur | 0.025 |
| Tetramethylthiuram disulfide | 0.03 |
| Mercaptobenzothiazole | 0.02 | then (2) curing 10-mil films of the milled compound by heating in a press for 60 minutes at 160° C. The cured products were characterized as shown as items 1–7, Table I.

*Example 2.*—Other products were made and treated in the same manner and with the same quantities as in Example 1 except the amount of AR benzene was increased to 140 g., and a different ethylene copolymer rubber and different chlorine-containing compounds were used. The rubber used for modification was a copolymer comprising about 48 percent of units derived from ethylene and about 52 percent of units derived from propylene, and having an RSV value of 4.3 and less than 1 percent crystallinity. The particular chlorine-containing compounds used, the chlorine content of the modified rubber and the test results for the subsequently cured material are shown in the appropriate columns of Table I, items 8 and 9.

*Example 3.*—To a benzene solution at a concentration of 6.68 percent of an ethylene-propylene rubber comprising about 43 mole percent of units derived from ethylene and about 57 mole percent of units derived from propylene, and having an RSV value of 4.0 and less than 1 percent crystallinity were added 4 parts of 2,5-di-t-butyl-peroxy-2,5-dimethylhexyne-3 per hundred parts of the rubber and a chlorine-containing compound of the kind and quantity shown in items 10–13, Table I. The mixture was heated for 1 hour at 170° C. in a one-gallon, stirred, stainless steel autoclave. The product was then recovered, analyzed for chlorine content, cured and characterized as described in Example 1. The characteristics of the products after curing are shown in the appropriate columns of Table I, items 10–13.

TABLE I

| Item No. | Example No. | Chlorine-Containing Compound | Phr.[1] | Chlorine-Content, percent | Weight Swelling ratio | Percent Gel | Cross-link Concentration, mole/liter |
|---|---|---|---|---|---|---|---|
| 1 | 1 | Trichloroethylene | 26.28 | .54 | 3.98 | 83.6 | 0.061 |
| 2 | 1 | Hexachlorobutadiene | 52.2 | .27 | 3.50 | 85.3 | .088 |
| 3 | 1 | 1,2,3-trichloropropene | 29.1 | .5 | 3.22 | 89.4 | .116 |
| 4 | 1 | 1,1,2-trichloro-3,3,3-trifluoropropene | 39.7 | .24 | 3.61 | 84.7 | .081 |
| 5 | 1 | 1,3,4,4-tetrachloro-1,2,3,4-tetrafluorobutene-1 | 53.2 | (²) | 3.21 | 88.1 | .106 |
| 6 | 1 | Hexachlorocyclopentadiene | 66.7 | 1.55 | 3.34 | 83.7 | .098 |
| 7 | 1 | Tetrachloroethylene | 32.0 | (²) | 3.83 | 86.6 | .071 |
| 8 | 2 | Hexachloroethane | 47.4 | 1.24 | 3.78 | 85.2 | .072 |
| 9 | 2 | Carbon tetrachloride | 30.8 | .82 | 3.52 | 87.9 | .090 |
| 10 | 3 | Hexachloropropene | 50.0 | 3.24 | 3.98 | 88.5 | .065 |
| 11 | 3 | 1,2-dichlorohexafluro-cyclopentene-1 | 47.0 | .09 | 4.67 | 84.4 | .040 |
| 12 | 3 | 1,4-dichlorobutene-2 | 25.0 | .28 | 5.00 | 82.2 | .032 |
| 13 | 3 | Allyl chloride | 15.3 | .13 | 3.95 | 90.9 | .068 |

[1] Parts of chlorine-containing compound per 100 parts of rubber, by weight.
[2] Not analyzed.

*Example 4.*—Other 6.5-gram portions of the same starting ethylene-propylene rubber as used in Example 1 were dissolved individually in 78.5 g. of AR benzene, then to that solution were added 0.26 g. of 2,5-di-t-butyl-peroxy-2,5-dimethylhexyne-3 and 0.013 mole of the chlorine-containing compound as shown for each run in Table II. The mixture was heated for one hour at 170° C. in a 170-ml. Z-nickel bomb which had been placed in a Wood's metal bath. The recovery of the product and subsequent vulcanization were carried out in the same manner as Example 1. The results are shown in Table II.

prising about 43 mole percent of units derived from ethylene and about 57 mole percent of units derived from propylene, and having an RSV value of 4.0 and less than 1 percent crystallinity were added 4 parts of dicumyl peroxide per hundred parts of rubber and a chlorine-containing compound of the kind and quantity shown in items 1–9, Table III. The mixture was heated for 1 hour at 160° C. in a one-gallon, stirred, stainless steel autoclave. The product was then recovered, cured and characterized as described in Example 1. The characteristics of the cured products are shown in Table III.

TABLE II

| Item No. | Chlorine-Containing Compound | Phr.[1] | Chlorine-content, Percent | Weight Swelling Ratio | Percent Gel | Cross-link Concentration, moles/liter | Ultimate Elongation, Percent | Tensile Strength, p.s.i. |
|---|---|---|---|---|---|---|---|---|
| 1 | Cis-dichloroethylene | 19.4 | .16 | 3.11 | 91.1 | 0.12 | 828 | 2,126 |
| 2 | Trans-dichloroethylene | 19.4 | .315 | 2.57 | 93.2 | .22 | 616 | 2,741 |
| 3 | Vinylidene chloride | 19.4 | (²) | 2.64 | 93.0 | .13 | 390 | 2,263 |
| 4 | 1,2-dichloro-1,2-difluoroethylene | 26.6 | .36 | 3.11 | 89.4 | .12 | 460 | 1,167 |
| 5 | 3-chloro-3,3-difluoropropene | 25.4 | .825 | 4.38 | 82.1 | 0.46 | 552 | 678 |

[1] Parts of chlorine-containing compound per 100 parts of rubber, by weight.  [2] Not determined.

*Example 5.*—To a benzene solution at a concentration of 6.68 percent of an ethylene-propylene rubber com-

TABLE III

| Item No. | Chlorine-Containnig Compound | Phr.[1] | RSV | Chlorine-content, percent | Weight Swelling Ratio | Percent Gel | Cross-link Concentration, moles/liter | Ultimate Elongation, percent | Tensile Strength, p.s.i. |
|---|---|---|---|---|---|---|---|---|---|
| 1 | Trichloroethylene | 26 | 3.3 | .04 | 5.84 | 83.2 | 0.021 | 1,486 | 880 |
| 2 | Hexachlorobutadiene | 52 | 2.5 | .13 | 4.92 | 86.4 | 0.35 | 1,170 | 1,350 |
| 3 | 1,2,3-trichloropropene | 29 | 2.35 | .04 | 3.46 | 91.6 | .098 | 997 | 2,333 |
| 4 | Hexachlorocyclopentadiene | 67 | 0.9 | 1.15 | 3.37 | 81.8 | .097 | 170 | 522 |
| 5 | Cis-dichloroethylene | 19 | 2.45 | .06 | 3.97 | 88.2 | .065 | 1,150 | 1,790 |
| 6 | Trans-dichloroethylene | 19 | 3.0 | | 3.38 | 91.6 | 1.04 | 1,063 | 2,100 |
| 7 | Vinylidene chloride | 19 | 3.15 | .07 | 3.05 | 93.2 | .14 | 856 | 2,546 |
| 8 | Hexachloroethane | 47 | 2.45 | .30 | 3.27 | 82.6 | .103 | 150 | 626 |
| 9 | Carbon tetrachloride | 31 | 1.85 | .19 | 3.01 | 93.5 | .15 | 576 | 2,103 |

[1] Parts of chlorine-containing compound per 100 parts of rubber, by weight.

*Example 6.*—An ethylene-propylene rubber, comprising about 48 mole percent of units derived from ethylene and about 52 percent of units derived from propylene, and having an RSV value of 4.3 and less than 1 percent crystallinity was heated in a one-gallon, stirred, stainless steel autoclave using the solvent, chlorine-containing compound and initiator for the time and at the temperature as shown for each item in Table IV. The products were recovered and cured by the method of Example 1. The characteristics of the products are shown in the last 5 columns of Table IV.

erties of 78.2 percent gel, a weight swelling ratio of 4.62 and a cross-link concentration of 0.036 molar.

*Example 10.*—To another portion of the benzene solution of ethylene-propylene copolymer rubber as used in Example 9 were added 4 parts of trichloromethane-sulfonyl chloride and 32 parts of tetrachloroethylene per 100 parts of the copolymer rubber. The resulting solution was heated for 1 hour at 190° C. in a one-gallon, stirred, stainless steel autoclave. The modified copolymer rubber which contained 0.25 percent by weight of chlorine was recovered and cured by the method of Ex-

TABLE IV

| Item No. | Benzene, grams | EPR, grams | Tetrachloroethylene, grams | Heating [1] Time, hr. | Heating [1] Temp., °C. | Chlorine-content, percent | Weight Swelling Ratio | Percent Gel [2] | Cross-link Concentration, moles/liter | Ultimate Elongation, percent | Tensile Strength, p.s.i. |
|---|---|---|---|---|---|---|---|---|---|---|---|
| 1 |  | 100 | 2,400 | 1 | 190 | 0.95 | 2.18 | 99.2 | 0.38 | 465 | 2,383 |
| 2 | 1,210 | 100 | 33 | 1 | 190 | [3] .26 | 2.73 | 97.1 | .20 | 823 | 2,697 |
| 3 | 1,481 | 120 | 33 | 1 | 159 | .14 | 3.10 | 95.1 | .14 | 878 | 2,183 |
| 4 |  | 100 | 2,400 | 0.25 | 178 | 3.85 | 3.03 | 94.5 | .15 | 667 | 2,023 |
| 5 |  | 100 | 2,400 | 0.25 | 178 | 3.85 | 2.88 | 95.6 | .17 | 773 | 2,173 |
| 6 |  | 100 | 2,400 | 0.25 | 178 | 3.85 | 2.80 | 96.3 | .18 | 700 | 1,637 |

[1] Items 1 and 2, 2,5-di-t-butylperoxy-2,5-dimethylhexyne-3 initiator, 4 grams. Items 3 to 6, Dicumyl peroxide initiator, 4 grams.
[2] Items 1 to 4, HAF carbon black used in the curing step. Item 5, EPC carbon black. Item 6, SRF Carbon black.
[3] By the neutron-activation method.

*Example 7.*—By stirring at 120° C. under a nitrogen blanket in a Waring Blendor, 100 grams of an ethylene-propylene rubber comprising about 42 mole percent of units derived from ethylene and about 58 mole percent of units derived from propylene and having an RSV value of 3.5 and a relative crystallinity of 4.3 percent was dissolved in 1000 grams of tetrachloroethylene. To the solution was added 3 grams of benzoyl peroxide and the stirring was continued for an additional 4 hours at the same temperature. The modified rubber, after precipitation in methanol and drying in a vacuum oven, contained 1.48 percent chlorine. A 10-mil film was cured using the recipe of Example 1 except that the cure time was 40 minutes. The vulcanizate had a gel content of 81.4 percent, a cross-link concentration of 0.085 molar, a tensile strength of 1750 p.s.i. and an ultimate elongation of 840 percent.

*Example 8.*—To a benzene solution at a concentration of 6.68 percent of an ethylene-propylene rubber comprising about 43 mole percent of units derived from ethylene and about 57 mole percent of units derived from propylene, and having an RSV value of 4.0 and less than 1 percent crystallinity were added 2.9 parts t-butyl perbenzoate and 33 parts tetrachloroethylene per 100 parts of the copolymer rubber. The resulting solution was heated for 1 hour at 140° C. in a one-gallon, stirred, stainless steel autoclave. After it was precipitated with methanol and dried in a vacuum oven at 60° C., the modified rubber had an RSV value of 2.05. The chlorine content of the modified rubber (determined as hereinbefore described) was 0.04 percent by weight. A 10-mil film of the modified rubber prepared and cured by the method of Example 1 had a gel content of 85.8 percent, a weight swelling ratio of 4.41 and a cross-link concentration of 0.047 molar.

*Example 9.*—To another portion of the benzene solution as used in Example 8 were added 4 parts of N,2,6-trichloroquinonimide and 32 parts of tetrachloroethylene per 100 parts of the copolymer rubber. The resulting solution was heated for 1 hour at 190° C. in a one-gallon, stirred, stainless steel autoclave. About 17 percent of the product gelled in the reactor. The ungelled material was isolated, precipitated with methanol, dried in a vacuum oven at 60° C. and found to contain 0.43 percent by weight of chlorine. From the thus-obtained modified rubber, a 10-mil film was prepared and cured according to the method of Example 1. The cured film had the propample 1. The vulcanizate had a gel content of 94.0 percent, a weight swelling ratio of 2.74 and a cross-link concentration of 0.19 molar.

*Example 11.*—A product was prepared and cured as in Example 10 except that 3.1 parts of carbon tetrachloride was substituted for the trichloromethane sulfonyl chloride of the prior example and heating was for 4 hours at 190° C. instead of for one hour. The modified copolymer rubber contained 0.39 percent chlorine and the subsequently cured product had a gel content of 93.9 percent, a weight swelling ratio of 2.98 and a cross-link concentration of 0.15 molar.

*Example 12.*—To another portion of the benzene solution of ethylene-propylene copolymer rubber as used in Example 8 were added 3.5 parts of hexachloroethane and 32 parts of tetrachloroethylene per 100 parts of the copolymer rubber. The resulting solution was heated for 4 hours at 190° C., in a one-gallon, stirred, stainless steel autoclave. After the modified rubber was precipitated with methanol and dried in a vacuum oven at 60° C., it had an RSV value of 2.25 and a chlorine content of 0.07 percent. A 10-mil film of the modified rubber prepared and cured by the method of Example 1 had a gel content of 91.3 percent, a weight swelling ratio of 3.44 and a cross-link concentration of 0.10 molar.

*Example 13.*—To another portion of the benzene solution of ethylene-propylene copolymer rubber as used in Example 8 were added 24 parts of hexachloroethane and 17 parts of tetrachloroethylene per 10 parts of the copolymer rubber. The resulting solution was heated for 4 hours at 250° C. in a stainless steel bomb. After the modified rubber was precipitated with methanol and dried in a vacuum oven at 60° C., it had an RSV value of 0.55 and a chlorine content of 0.40 percent by weight. A 10-mil film of the modified rubber prepared and cured by the method of Example 1 had a gel content of 95.0 percent, a weight swelling ratio of 2.28, a cross-link concentration of 0.33 molar, a tensile strength of 1983 p.s.i. and an elongation of 233 percent.

*Example 14.*—Another portion of the same ethylene-propylene rubber as used for Example 8 was dissolved in carbon tetrachloride to form a 4 percent solution. To this solution was added 4 parts of dicumyl peroxide per 100 parts of rubber in the solution. The latter solution was heated for one hour at 160° C. in a one-gallon, stirred, stainless steel autoclave. After the modified rubber was precipitated with methanol and dried in a vacuum oven at 60° C., it had an RSV value of 2.85 and a chlorine content of 0.12 percent by weight. A 10-mil film of the modified rubber prepared and cured by the method of Example 1 had a gel content of 93.3, a weight swelling ratio of 2.53, a cross-link concentration of 0.23 molar, a tensile strength of 2196 p.s.i. and an elongation of 510 percent.

*Example 15.*—A copolymer rubber comprising about 42 mole percent of units derived from ethylene, about 54 mole percent of units derived from propylene, and about 4 mole percent of units derived from vinyl toluene and having an RSV value of 7.1 and a relative crystallinity of 4.3 percent was dissolved in tetrachloroethylene to form a 4 percent solution, then 4 parts of 2,5-di-t-butyl-peroxy-2,5-dimethylhexyne-3 per 100 parts of the copolymer rubber was added. The solution was heated for one hour in a glass bomb at from 160 to 170° C. The vulcanizate obtained after coagulating, drying, and curing the modified rubber by the method of Example 1 had a gel content of 82.0 percent, a weight swelling ratio of 4.53 and a cross-link concentration of 0.042.

*Example 16.*—An ethylene-propylene copolymer rubber comprising about 70.5 mole percent of units derived from ethylene and about 29.5 percent of units derived from propylene and having an RSV value of 9.4 and a relative crystallinity of 0.6 percent was dissolved in o-dichlorobenzene to form a 2.8 percent solution. To that solution were added 150 parts tetrachloroethylene and 5.6 parts of 2,5-di-t-butylperoxy-2,5-dimethylhexyne-3 per 100 parts of the copolymer rubber, then the solution was stirred under a blanket of nitrogen in a Waring Blendor for 0.5 hour at 150–160° C., then 1 hour at 160–168° C. The vulcanizate, obtained after coagulating, drying and curing the modified rubber by the method of Example 1, had a gel content of 73.0 percent, a weight swelling ratio of 5.39 and a cross-link concentration of 0.023 molar.

*Example 17.*—To 100 grams of an ethylene-propylene copolymer rubber comprising about 42 mole percent of units derived from ethylene and about 58 mole percent of units derived from propylene and having an RSV value of 3.5 and a relative crystallinity of 4.3 percent were added 5 grams of zinc oxide, 2 grams of stearic acid, 10 grams of dicumyl peroxide and 14 grams of tetrachloroethylene with thorough mixing on unheated laboratory rolls. The resulting compounded material was heated in a press for 40 minutes at 170° C., then devolatized in a vacuum oven. The vulcanizate obtained from the modified rubber, after it was cured by the method of Example 1, had a gel content of 89.5 percent and a cross-link density of 0.16 molar.

*Example 18.*—To 100 grams of an ethylene-propylene copolymer rubber comprising about 40 mole percent of units derived from ethylene and about 60 mole percent of units derived from propylene and having an RSV value of 12 and a relative crystallinity of 5.8 percent were added 3.5 grams of tetrachloroethylene and 1 gram of dicumyl peroxide with thorough mixing on unheated laboratory rolls. The compounded material was next heated in a press for 20 minutes at 170° C., and then devolatized in a vacuum oven. The modified rubber contained 0.49 percent chlorine. The vulcanizate obtained from the modified rubber, after it was cured by the method of Example 1, had a gel content of 85.0 percent, a cross-link concentration of 0.068 molar, a tensile strength of 1830 p.s.i. and an ultimate elongation of 620 percent.

*Example 19.*—An ethylene-propylene copolymer rubber comprising about 48 mole percent of units derived from ethylene and about 52 mole percent of units derived from propylene and having an RSV value of 4.4 and less than 1 percent relative crystallinity was dissolved in tetrachloroethylene to give a 4 percent solution. The resulting solution was placed in a stainless steel bomb. The stainless steel bomb and contents were maintained at 160° C. while being irradiated from a Cobalt-60 source with a total dose of 1.7 Mrad over a period of 61 hours. After the modified rubber was coagulated and dried by the method of Example 1, it had a RSV value of 1.25 and a chlorine content of 1.01 percent by weight. The vulcanizate, which was obtained after curing the modified rubber by the method of Example 1, had a gel content of 85.9 percent, a weight swelling ratio of 4.32, a cross-link concentration of 0.051 molar, a tensile strength of 825 p.s.i., and an ultimate elongation of 542 percent.

*Example 20.*—An ethylene-propylene copolymer rubber comprising about 42 mole percent of units derived from ethylene and about 58 mole percent of units derived from propylene and having an RSV value of 3.55 and a relative crystallinity of less than 1 percent was dissolved in benzene to form a 6.68 percent solution. To this solution were added 4 parts dicumyl peroxide and 34 parts tetrachloroethylene per 100 parts of the copolymer rubber with subsequent heating at from 100 to 134° C. for 8 hours. After the modified rubber was coagulated with methanol and dried in a vacuum oven at 60° C., it had an RSV value of 2.3. Portions of the dried, modified copolymer rubber (shown in the table as EPR) were blended with other rubbers and the blends were then cured in order to check compatibility of cure. The recipes and other data are shown in Table V.

TABLE V.—VULCANIZATION OF BLENDS OF UNSATURATED RUBBERS WITH MODIFIED ETHYLENE-PROPYLENE RUBBER

| Material Used | Unit | Sample No. | | | | | | |
|---|---|---|---|---|---|---|---|---|
| | | 1 | 2 | 3 | 4 | 5 | 6 | 7 |
| Modified EPR | G. | 25 | 25 | 75 | 25 | 25 | 50 | 50 |
| SBR 1006 | G. | 75 | 75 | | | | | |
| Chlorobutyl Rubber (Enjay HT 10-66) | G. | | | 25 | 75 | 75 | | |
| Polyisoprene (Coral A) | G. | | | | | | 50 | |
| Polybutadiene | G. | | | | | | | 50 |
| HAF carbon black | G. | 50 | 50 | 50 | 50 | 50 | 50 | 50 |
| Amberol ST 137 X | G. | 5 | 5 | 5 | 5 | 5 | 5 | 5 |
| Zinc oxide | G. | 5 | 5 | 5 | 5 | 5 | 5 | 5 |
| Sulfur | G. | 2 | 2 | 2 | 2 | 2 | 2 | 2 |
| Benzothiazyl disulfide | G. | 1 | | | 1 | | | |
| Tetramethylthiuram disulfide | G. | | 1 | 1 | | 1 | 1 | 1 |
| Mercaptobenzothiazole | G. | | 2 | 2 | | 2 | 2 | 2 |
| Cure at 150° C | Min. | 60 | 20 | 60 | 60 | 60 | 40 | 40 |
| Weight Swelling Ratio | | 4.85 | 3.53 | 4.50 | 3.06 | 3.04 | 6.66 | 3.39 |
| Gel | % | 85.5 | 90.6 | 84.7 | 91.9 | 93.7 | 83.6 | 77.5 |

What is claimed is:

1. A method for making a sulfur-curable non-cross-linked modified ethylene copolymer rubber from a starting ethylene copolymer rubber having less than about 10 percent relative crystallinity and less than about 0.3 mole of residual ethylenic double bonds per liter of copolymer rubber by intimately mixing one part of the ethylene copolymer rubber with from about 0.035 part to about 24 parts by weight of a chlorine-containing halohydrocarbon, wherein the halogen atoms have atomic numbers from 9 to 17, and effecting reaction between the ethylene copolymer rubber and the chlorine-containing halohydrocarbon by reactive free radical producing means at a temperature between about 120° C. and about 250° C. whereby there is obtained a modified ethylene copolymer rubber having less than about 4 percent by weight of chlorine; said starting copolymer rubber comprising (a) from about 20 to about 80 mole percent of units derived from ethylene, (b) from about 80 to about 20 mole percent of units derived from a terminally unsaturated mono-olefin having the formula $$RCH=CH_2$$

where R is a $C_1$ to $C_4$ alkyl radical, and (c) from 0 to about 10 mole percent of units derived from a monovinyl aromatic monomer; and said chlorine-containing halohydrocarbon being selected from the class consisting of carbon tetrachloride, hexachloroethane and a halogen-substituted ethylenically unsaturated aliphatic hydrocarbon having at least one of two classes of chlorine substituents, Class A being a chlorine atom attached to an allylic carbon atom and Class B being at least two chlorine atoms attached to doubly bonded carbon atoms.

2. The method of claim 1 in which the halogen-substituted ethylenically unsaturated aliphatic hydrocarbon is selected from the group consisting of 1,2-dichloroethylene, trichloroethylene, tetrachloroethylene, hexachlorobutadiene, 1,2,3-trichloropropene, hexachloropropene, 1,1,2-trichloro-3,3,3-trifluoropropene, hexachlorocyclopentadiene, 1,2 - dichlorohexafluorocyclopentene-1, vinylidene chloride, 1,2-dichloro-1,2-difluoroethylene, 1,3,4,4-tetrachloro - 1,2,3,4-tetrafluorobutene-1, 3-chloro-3,3-difluoropropene, 1,4-dichlorobutene-2, and allyl chloride.

3. The method of claim 1 wherein the terminally unsaturated mono-olefin is propylene.

4. The method of claim 1 in which the monovinyl aromatic monomer is vinyl toluene.

5. The method of claim 1 in which the halohydrocarbon is a halogen-substituted ethylene having at least 2 chlorine substituents.

6. The method of claim 1 in which the chlorine-containing halohydrocarbon is carbon tetrachloride or hexachloroethane.

7. The method of claim 6 in which the temperature is between about 190° C. and about 250° C.

8. A composition of matter comprising the product obtained by the process of claim 1.

9. The method of claim 1 in which the temperature is from about 135° C. to about 200° C.

References Cited

UNITED STATES PATENTS 3,153,029  10/1964  Tabar et al. _____ 260—878

FOREIGN PATENTS 783,790  10/1957  Great Britain.

OTHER REFERENCES

Natta et al.: Kautschuk and Gurnine, 14, 54 WT (1961), Paper No. 244, "A Collection of Original Papers," pp. 54 WT–61 WT.

Wei et al.: Rubber Chemistry and Technology 35, 1091–1100 (1962).

SAMUEL H. BLECH, *Primary Examiner.*

MURRAY TILLMAN, *Examiner.*

D. J. BREZNER, *Assistant Examiner.*